United States Patent
Kawamura

(10) Patent No.: US 7,599,080 B2
(45) Date of Patent: Oct. 6, 2009

(54) IMAGE FORMING APPARATUS AND PRINTER DRIVER DELIVERY SYSTEM

(75) Inventor: Noriyoshi Kawamura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 807 days.

(21) Appl. No.: 11/334,404

(22) Filed: Jan. 19, 2006

(65) Prior Publication Data
US 2006/0170946 A1    Aug. 3, 2006

(30) Foreign Application Priority Data
Jan. 31, 2005   (JP) .............................. 2005-022460

(51) Int. Cl.
*G06F 15/00* (2006.01)
*G06F 15/177* (2006.01)
(52) U.S. Cl. ...................................... 358/1.13; 709/221
(58) Field of Classification Search ................ 358/1.13, 358/1.15, 1.14, 1.16, 1.18, 1.12, 3.24, 426.04; 709/201, 203, 206, 221, 222, 226; 399/16, 399/23, 24, 47, 82; 717/174, 176; 400/61, 400/76, 582; 719/321
See application file for complete search history.

(56) References Cited

U.S. PATENT DOCUMENTS
2003/0051011 A1* 3/2003 Schacht et al. .............. 709/221

FOREIGN PATENT DOCUMENTS
JP    11-143662    4/1997

* cited by examiner

*Primary Examiner*—Saeid Ebrahimi Dehkordy
(74) *Attorney, Agent, or Firm*—Kubotera & Associates, LLC

(57) ABSTRACT

A printer driver delivery system delivers a printer driver to an information processing device through a specific network. A delivery device includes a delivery destination list storage unit for storing a delivery destination list according to information of an image forming apparatus to which a printer driver is delivered; a printer driver storage unit for storing the printer driver; and a delivery unit for delivering the printer driver to an image forming apparatus. The image forming apparatus includes a receiving unit for receiving the printer driver from the delivery device; a destination list storage unit for storing a destination list according to information of the information processing device as a destination to which the printer driver is sent; a determining unit for determining the destination according to the destination list; and a sending unit for sending the printer driver to the information processing device.

13 Claims, 10 Drawing Sheets

| Delivery destination name | Image forming apparatus IP address | Image forming apparatus model name | Completion status |
|---|---|---|---|
| AAA | XXX.XX0.XXX.XX1 | Model A | YET |
| AAA | XXX.XX0.XXX.XX2 | Model A | DONE |
| BBB | XXX.XX1.XXX.XX1 | Model B | ONGOING |
| CCC | XXX.XX2.XXX.XX1 | Model C | RETRY |
| ⋮ | ⋮ | ⋮ | ⋮ |

Cancel    Complete
46

FIG. 3 (a)

Send created delivery destination list to delivery device?

YES    NO

FIG. 3 (b)

Send created destination list to image forming apparatus?

YES    NO

| Log-in name | Information processing device IP address | Update printer driver? | OS name | OS version |
|---|---|---|---|---|
| AA1 | YYY.YY0.YYY.YY1 | Update | OS A | 5.00.2195 |
| BB2 | YYY.YY0.YYY.YY2 | Update | OS B | 4.01 |
| CC3 | YYY.YY1.YYY.YY1 | Not update | OS C | 3.1 |
| DD4 | YYY.YY2.YYY.YY1 | Not update | OS D | 1.0 |

CANCEL    COMPLETE

46

| Printer driver name | Update date | Version number | Applied OS name | Printer driver actual file name | Status whether printer driver is sent to image forming apparatus |
|---|---|---|---|---|---|
| AAA | 20040101 | 1.0 | OS A | ABC1.drv | Done |
| AAA | 20040101 | 1.0 | OS B | ABC2.drv | Done |
| AAA | 20040201 | 1.0.1 | OS A | ABC3.drv | Yet |
| AAA | 20040301 | 1.1 | OS A | ABC4.drv | Yet |

FIG. 7

| Log-in name | Update data | Version number | OS name | Update result |
|---|---|---|---|---|
| AAA 1 | 20040301 | 1.1 | OS A | YET |
| AAA 2 | 20040201 | 1.0.1 | OS B | NOT |
| AAA 3 | 20040101 | 1.0 | OS A | DONE |
| AAA 4 | 20040405 | 2.0 | OS C | NOT |

FIG. 9

IMAGE FORMING APPARATUS AND PRINTER DRIVER DELIVERY SYSTEM

BACKGROUND OF THE INVENTION AND RELATED ART STATEMENT

The present invention relates to an image forming apparatus and a printer driver delivery system.

In a conventional image forming apparatus, a specific printer driver corresponding to the image forming apparatus is installed in an information process unit thereof before printing. When such a printer driver is updated, a recoding medium such as a CD is used for updating the printer driver, or a user downloads an updated driver through Internet and installs the driver. Alternatively, when a printer driver is updated, an electrical mail may be sent to a user to notify that a new printer driver is available. In such a case, the user retrieves the printer driver attached to the electrical mail and installs the driver (refer to Patent Reference 1). Patent Reference 1: Japanese Patent Publication No. 11-143662

In Patent Reference 1, a host computer or an individual information terminal is selected through an operation unit of an image forming apparatus. A printer driver stored in a storage unit of the image forming apparatus is downloaded to the host computer or the individual information terminal through an interface. In the system disclosed in Patent reference 1, the user needs to obtain the printer driver based on the printer driver update information, thereby posing cumbersome task to the user.

In view of the problems described above, an object of the present invention is to provide an image forming apparatus and a printer driver delivery system, in which it is possible to easily update a printer driver.

Further objects and advantages of the invention will be apparent from the following description of the invention.

SUMMARY OF THE INVENTION

In order to attain the objects described above, according to the present invention, a printer driver delivery system delivers a printer driver stored in a delivery device to an information processing device on a specific network through the specific network. The delivery device includes a delivery destination list storage unit for storing a delivery destination list according to information of an image forming apparatus as a delivery destination to which a printer driver is delivered; a printer driver storage unit for storing the printer driver; and a delivery unit for delivering the printer driver stored in the printer driver storage unit to the image forming apparatus.

According to the present invention, the image forming apparatus includes a receiving unit for receiving the printer driver delivered from the delivery device; a destination list storage unit for storing a destination list according to information of the information processing device on a specific network as a destination to which the printer driver is sent; a determining unit for determining the destination of the printer driver according to the destination list; and a sending unit for sending the printer driver received by the receiving unit to the information processing device according to a result of the determining unit.

With the configuration described above, it is possible to deliver the printer driver to the image forming apparatus specified according to the delivery destination list with the delivery unit of the delivery device. The image forming apparatus receiving the printer driver can send the printer driver to the information processing device on the specific network specified according to the destination list stored in the destination list storage unit.

According to the present invention, an image forming apparatus includes an obtaining unit for obtaining a printer driver delivered from an external device; a destination list storage unit for storing a destination list according to information of an information processing device on a specific network as a destination to which the printer driver is sent; a determining unit for determining the destination of the printer driver according to the destination list; a sending unit for sending the printer driver obtained by the obtaining unit to the information processing device according to a result of the determining unit; and a control unit for communicating with the information processing device and controlling the sending unit when the obtaining unit obtains the printer driver from the external device.

In the printer driver delivery system, the printer driver stored in the printer driver storage unit is delivered to the image forming apparatus according to the delivery destination list. The image forming apparatus sends the printer driver to the information processing device with the sending unit according to the destination list stored in the destination list storage unit and created in advance. Accordingly, a user does not need to use the information processing device to send an electrical mail to confirm that the delivery device has an updated printer driver.

BRIEF DESCRIPTION OF THE DRAWINGS

FIG. 3a is a schematic view showing an example of the delivery destination list, and FIG. 3b is a schematic view showing a display for prompting a user whether to send the delivery destination list to the delivery device;

FIG. 7 is a schematic view showing an example of an administration list;

FIG. 9 is a schematic view showing an example of an administration status list;

DETAILED DESCRIPTION OF PREFERRED EMBODIMENTS

Hereunder, embodiments of the present invention will be explained with reference to the accompanying drawings.

Figure 1:
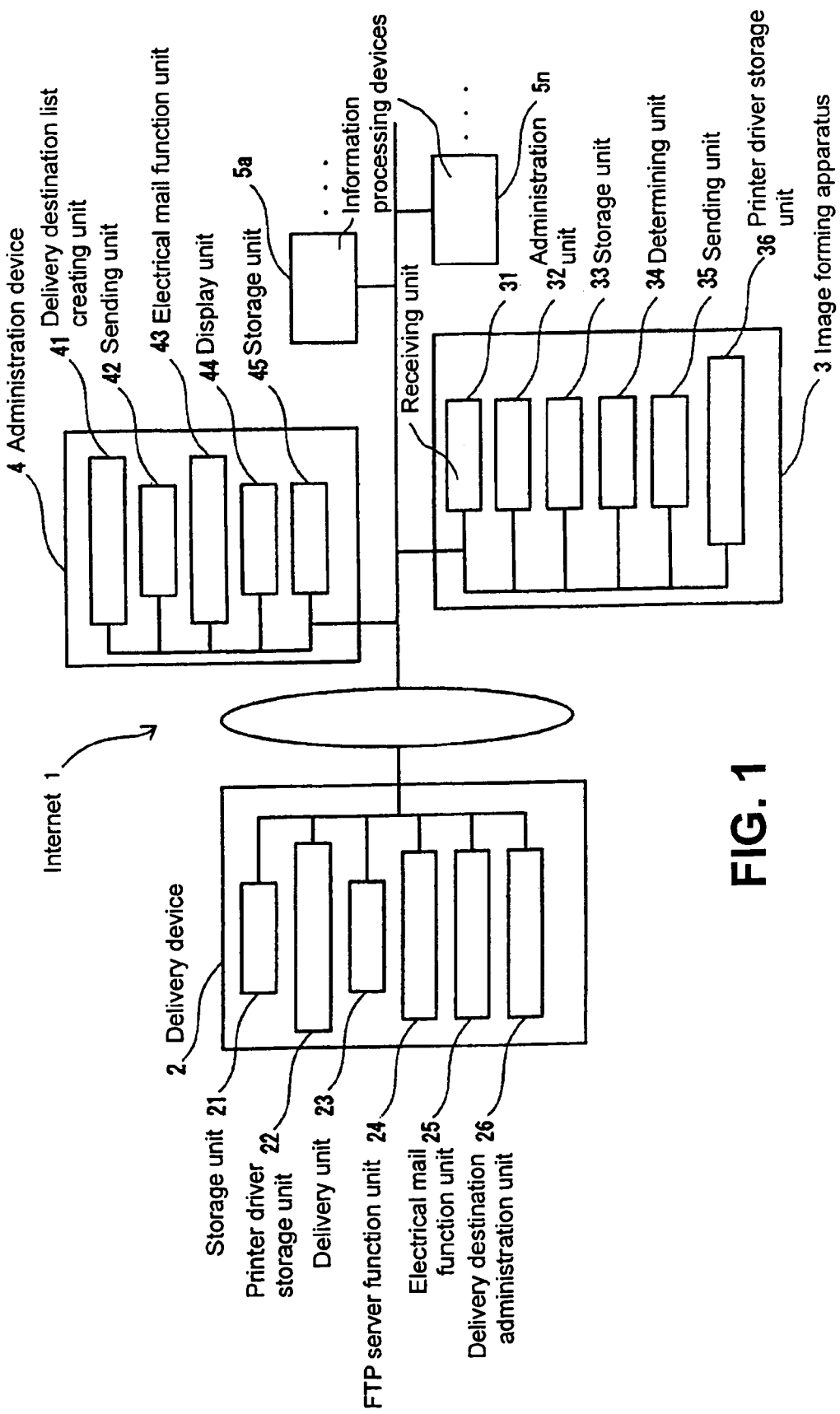
FIG. 1 is a schematic block diagram of a printer driver delivery system according to a first embodiment of the present invention.

FIG. 1 is a schematic block diagram of a printer driver delivery system 1 according to a first embodiment of the present invention. The printer driver delivery system 1 includes a delivery device 2 for administrating a printer driver; an image forming apparatus 3 for forming an image; an administration device 4 for directing a delivery destination of the printer driver; and a plurality of information processing devices 5a to Sn (information processing device 5) for receiving the printer driver from the delivery device 2.

The delivery device 2 may be an external device connected to Internet. The image forming apparatus 3, the administration device 4, and the information processing device 5 constitute a local area network (LAN) such as an intranet. The administration device 4 does not need to be a stand-alone device, and may be incorporated in the information processing device 5. In the embodiment, the image forming apparatus 3 is a printer; the delivery device 2 is a device installed at a side of a manufacture; and the information processing device 5 is a personal computer (PC).

The delivery device 2 includes a storage unit 21 for storing a delivery destination list (described later) as a delivery destination list storage unit; a printer driver storage unit 22 for storing the printer driver; a delivery unit 23 for externally delivering the printer driver; a FTP server function unit 24 for administrating file transfer protocol (FTP); an electrical mail function unit 25 for sending and receiving an electrical mail according to an external command; and a delivery destination administration unit 26 for receiving and storing the delivery destination list (described later) from the administration device 4.

The storage unit 21 is a storage device capable of storing the delivery destination list, and is formed of an RAM or a main memory of the delivery device 2, or an external device such as a hard drive. The printer driver storage unit 22 is a device capable of storing the printer driver, and is formed of an RAM, a main memory, or an external device such as a hard drive. The delivery unit 23 receives a specific file from outside through file transfer protocol (FTP), and externally delivers the printer driver. The FTP server function unit 24 functions as a server when the delivery unit 23 delivers the printer driver. The electrical mail function unit 25 externally sends information such as an electrical mail from the delivery device 2 through the network.

The image forming apparatus 3 includes a receiving unit 31 for receiving the printer driver delivered from the delivery device 2; an administration unit 32 for administrating a destination of the printer driver as a destination list storage unit and a storage unit; a storage unit 33 for storing the destination of the printer driver; a determining unit 34 for determining the destination of the printer driver according to the destination list stored in the administration unit 32 and a type of printer driver; a sending unit 35 for sending the printer driver to the information processing device 5 according to a result of the determining unit 34; and a printer driver storage unit 36 for storing the printer driver delivered from the delivery device 2.

The receiving unit 31 is capable of receiving the printer driver delivered from the delivery device 2 through an interface. The administration unit 32 is provided for referring to the destination list, and for administrating and storing the information processing device 5 to which the printer driver is to be sent. The storage unit 33 is provided for referring to the administration unit 32 upon sending the printer driver, and for temporarily storing the information processing device 5 to which the printer driver is to be sent. The storage unit 33 is formed of an RAM, a main memory, or an external device such as a hard drive.

The determining unit 34 is provided for referring to the destination list delivered from the administration device 4, and for determining the destination of the printer driver to be sent to the information processing device 5 according to a type of printer driver obtained from the delivery device 2. The sending unit 35 is provided for sending the printer driver to the information processing device 5 through an interface. The printer driver storage unit 36 is a device capable of storing the printer driver, and is formed of an RAM, a main memory, or an external device such as a hard drive.

The administration device 4 includes a creating unit 41 for creating the delivery destination list and the destination list; a sending unit 42 for sending the delivery destination list and the destination list to the delivery device 2 or the image forming apparatus 3; an electrical mail function unit 43 for sending and receiving an electrical mail; a display unit 44 for displaying information for a user; and a storage unit 45 for storing the delivery destination list and the destination list.

In the printer driver delivery system 1 with the configuration described above, the user uses the administration device 4 to create the delivery destination list and the destination list, and the delivery destination list and the destination list are delivered to the delivery device 2 or the image forming apparatus 3. The delivery destination list sent to the delivery device 2 includes information of the image forming apparatus 3 to which the delivery device 2 sends the printer driver. The destination list delivered to the image forming apparatus 3 includes information of the information processing device 5 to which the image forming apparatus 3 sends the printer driver. When the delivery device 2 receives the delivery destination list, the delivery device 2 delivers the printer driver to the image forming apparatus 3 according to the delivery destination list. When the image forming apparatus 3 receives the printer driver, the image forming apparatus 3 sends the printer driver to the information processing device 5 according to the destination list.

Figure 2:
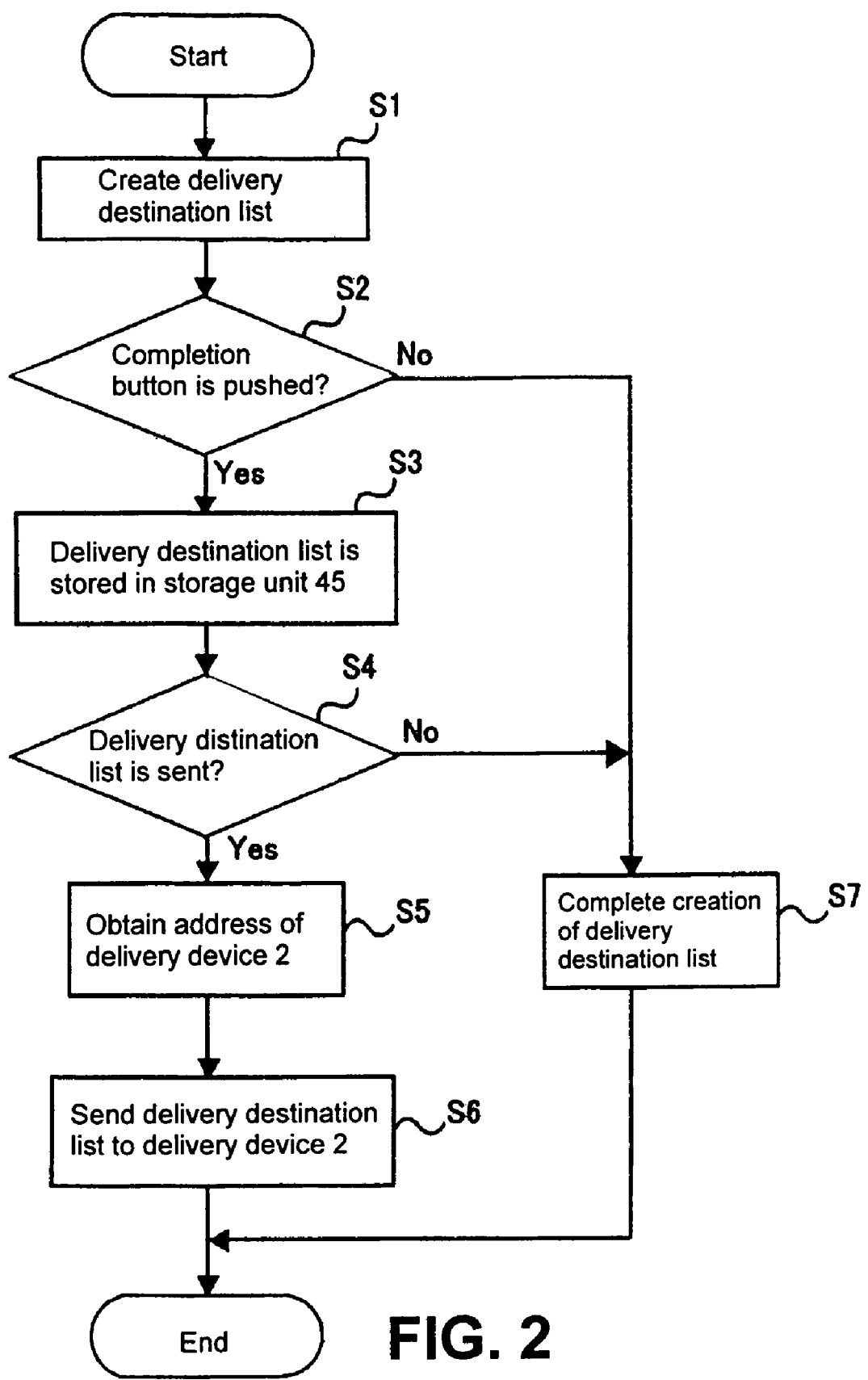
FIG. 2 is a flow chart showing a process of creating a delivery destination list and sending the delivery destination list to a delivery device.

In the printer driver delivery system 1, the administration device 4 creates the delivery destination list according to a flow chart shown in FIG. 2, and delivers the delivery destination list to the delivery device 2.

In step S1, when the user operates the administration device 4 to start a creation program of the delivery destination list, a creation screen shown in FIG. 3a is displayed on the display unit 44. The delivery destination list includes columns for displaying names of delivery destinations; IP addresses of the image forming apparatus; model names of the image forming apparatus; and completion status of updating the printer driver. When a new delivery destination list is created, the user inputs each of the contents of the delivery destination list. When a previous delivery destination list exists, the delivery destination list is displayed in step S1, so that the user can change, add, or delete the contents of the delivery destination list. In this case, when the user starts the creation program of the delivery destination list, it may be arranged such that the administration device 4 does not display the creation screen immediately. After the user is prompted to select whether a new delivery destination list is created or a previous delivery destination list is edited, the delivery destination list is created according to the direction of the user.

In step S2, it is determined that a completion button 46 is pushed. When the completion button 46 is not pushed, the process stays for a specific period of time, and then the process of creating the delivery destination list is completed in step S7. When a cancel button is pushed within the specific period of time, the process of creating the delivery destination list is similarly completed.

In step S3, when the completion button 46 is pushed within the specific period of time, the delivery destination list is created and stored in the storage unit 45. In this case, it may be arranged such that the display unit 44 displays a screen for the user to input a file name of the delivery destination list after the delivery destination list is created.

In step S4, the display unit 44 displays a screen shown in FIG. 3b, so that the user determines whether the delivery destination list is sent to the delivery device 2. When the delivery destination list is sent to the delivery device 2, the process proceeds to step S5, otherwise to step S7. When the user determines that the delivery destination list is not sent to the delivery device 2 in step S4, the process of creating the delivery destination list is completed in step S7.

In step S5, when the user determines that the delivery destination list is sent to the delivery device 2 in step S4, the administration device 4 obtains an address of the delivery device 2 stored in advance in the storage unit 45 as a delivery destination. In step S6, the administration device 4 negotiates with the delivery device 2 at the address obtained to establish a communication path, so that the delivery destination list is sent to the delivery destination administration unit 26 of the delivery device 2 through the sending unit 42. In this case, the address of the delivery device 2 may not be the one stored in the storage unit 45, and the user may directly input.

Figure 4:
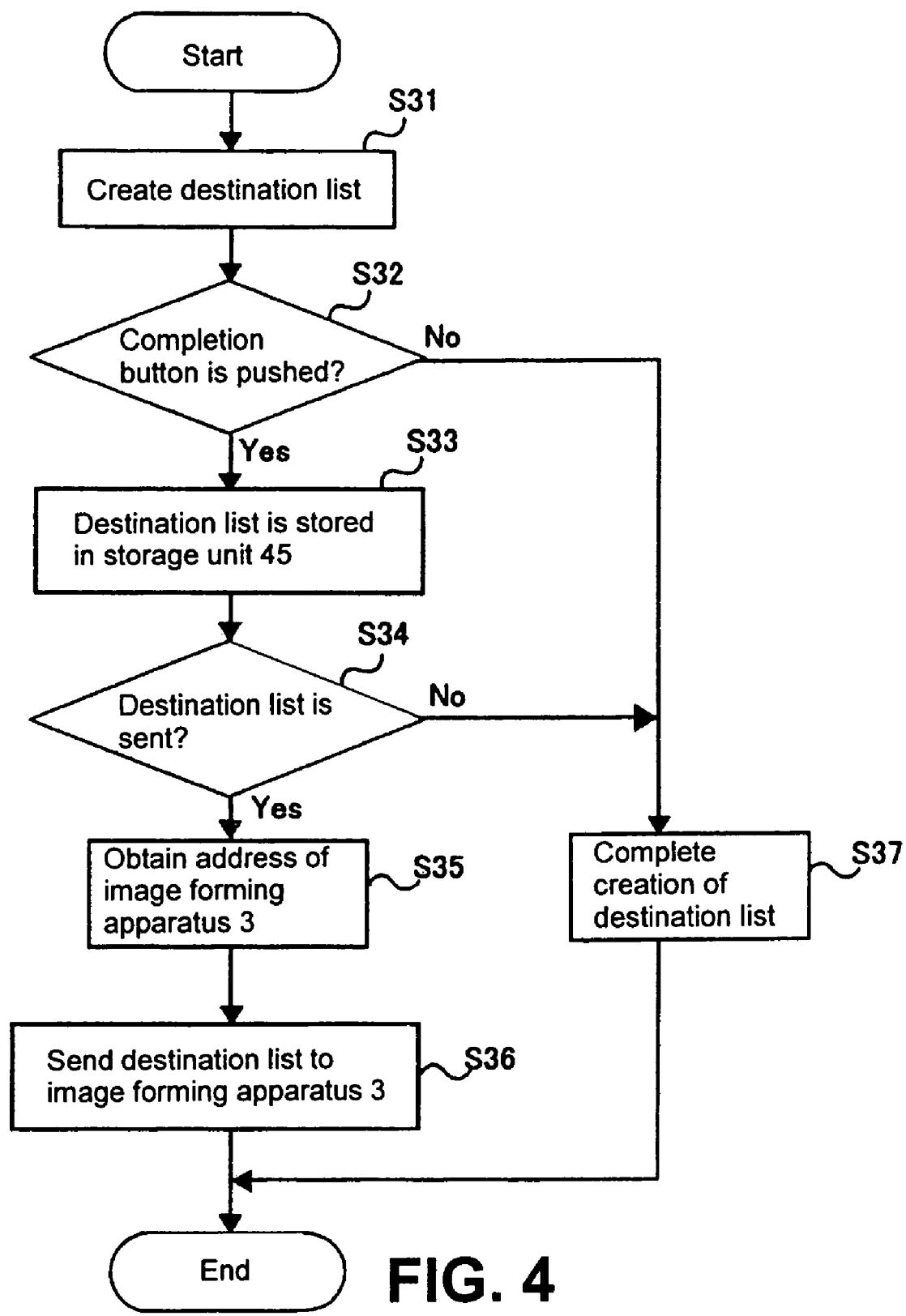
FIG. 4 is a flow chart showing a process of creating a destination list and sending the delivery destination list to an image forming apparatus.

In the printer driver delivery system 1, the destination list is created and sent to the image forming apparatus 3 according to a flow chart shown in FIG. 4.

Figure 5:
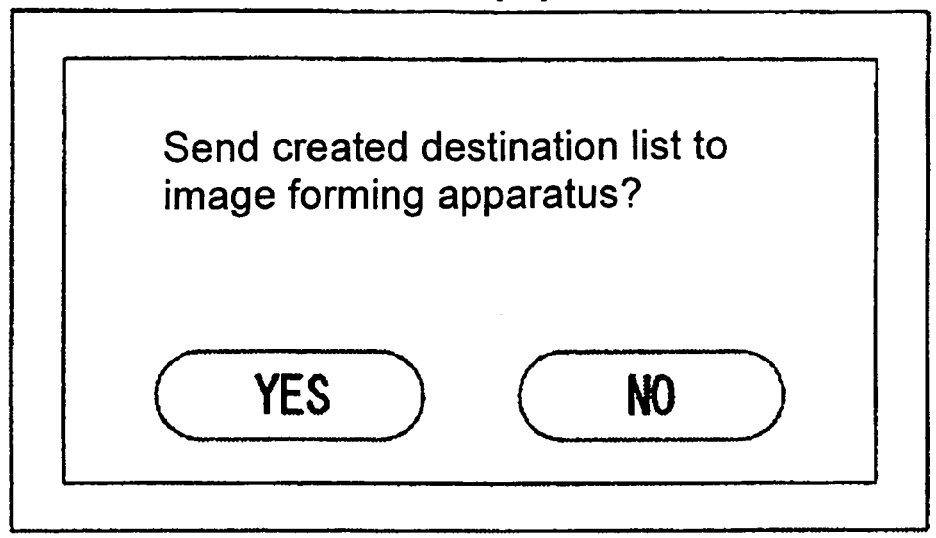
FIG. 5a is a schematic view showing an example of the destination list.
FIG. 5b is a schematic view showing a display for prompting the user whether to send the destination list to the image forming apparatus.
Figure 5:
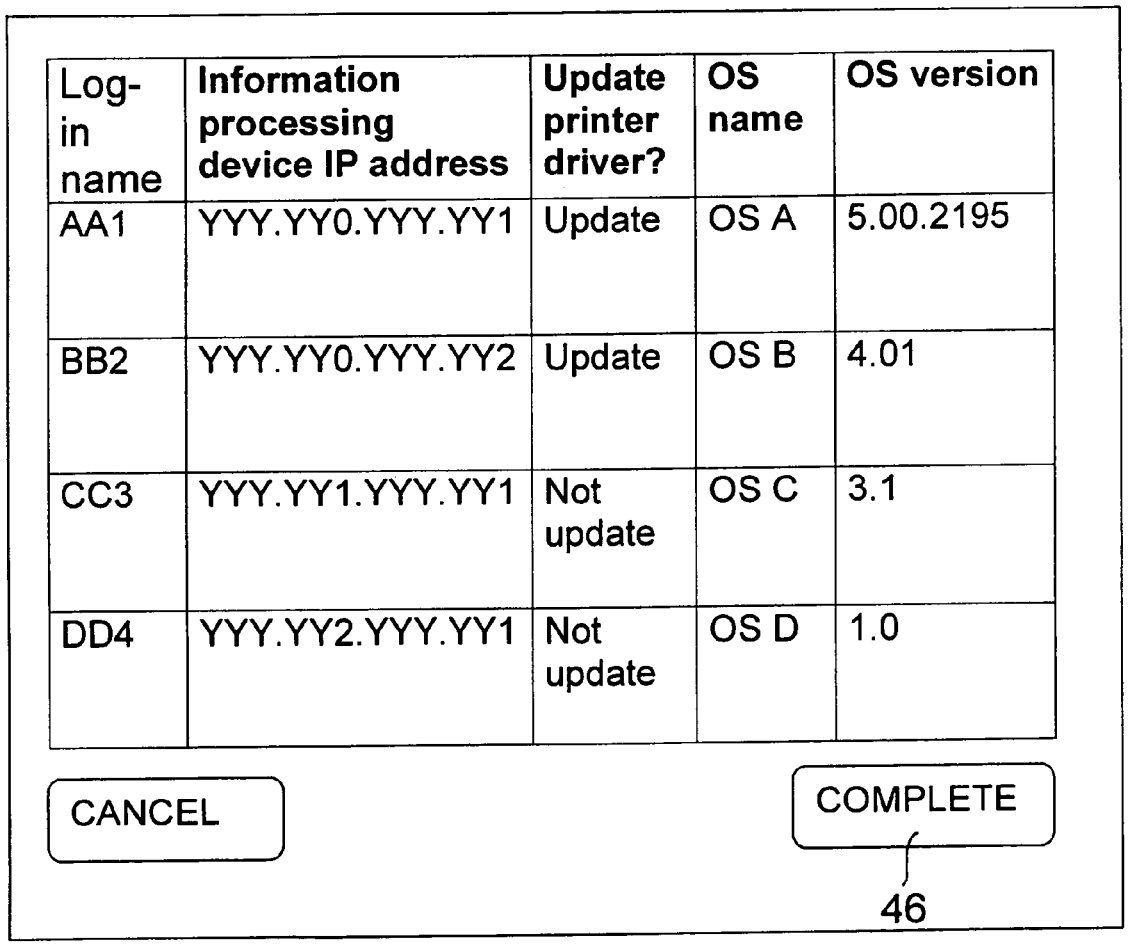

In step S31, when the user operates the administration device 4 to start a creation program of the destination list, a creation screen shown in FIG. 5a is displayed on the display unit 44. The destination list includes columns for inputting log-in names of the information processing devices; specific addresses of the information processing devices; commands whether the printer driver is updated; names of OS (operating system) used in the information processing devices; and versions of the OS.

When a new destination list is created, the user inputs each of the contents of the destination list. When a previous destination list exists, the destination list is displayed in step S31, so that the user can change, add, or delete the contents of the destination list. In this case, when the user starts the creation program of the destination list, it may be arranged such that the administration device 4 does not display the creation screen immediately. After the user is prompted to select whether a new destination list is created or a previous destination list is edited, the destination list is created according to the direction of the user.

In step S32, it is determined that the completion button 46 is pushed. When the completion button 46 is not pushed, the process stays for a specific period of time, and then the process of creating the destination list is completed in step S37. When a cancel button is pushed within the specific period of time, the process of creating the destination list is similarly completed.

In step S33, when the completion button 46 is pushed within the specific period of time, the destination list is created and stored in the storage unit 45. In this case, it may be arranged such that the display unit 44 displays a screen for the user to input a file name of the destination list after the destination list is created.

In step S34, the display unit 44 displays a screen shown in FIG. 5b, so that the user determines whether the destination list is sent to the image forming apparatus 3. When the user determines that the destination list is not sent to the image forming apparatus 3 in step S34, the process of creating the destination list is completed in step S37.

In step S35, when the user determines that the delivery destination list is sent to the image forming apparatus 3 in step S34, the administration device 4 obtains an address of the image forming apparatus 3 stored in advance in the storage unit 45 as a destination. In step S36, the administration device 4 negotiates with the image forming apparatus 3 of the address obtained to establish a communication path, so that the destination list is sent to the administration unit 32 of the image forming apparatus 3 through the sending unit 42. In this case, the address of the image forming apparatus 3 may not be the one stored in the storage unit 45, and the user may directly input.

Figure 6:
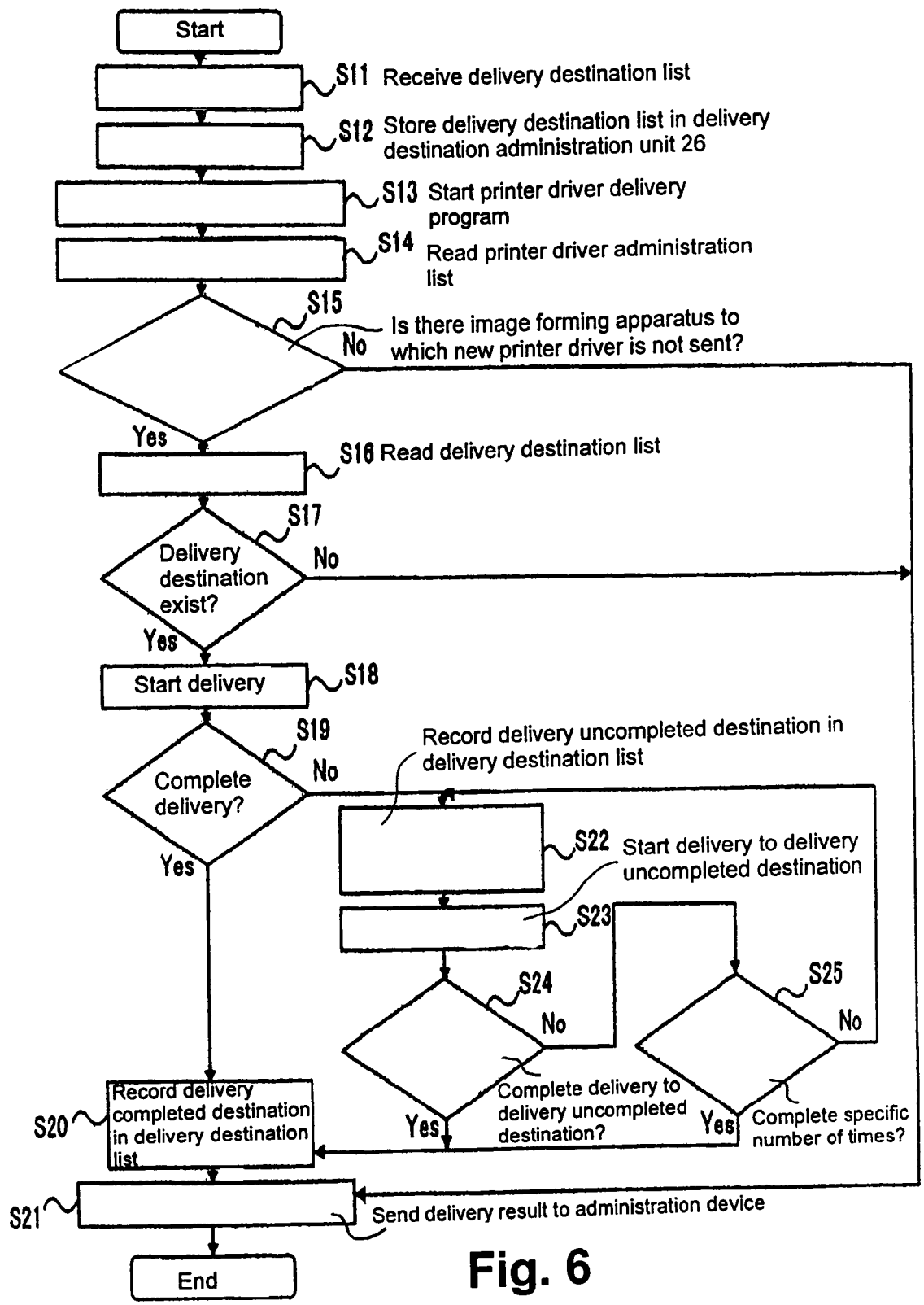
FIG. 6 is a flow chart showing a process of creating the destination list and sending the delivery destination list to the image forming apparatus.

After the delivery device 2 receives the destination list, the printer driver is sent to the image forming apparatus 3 according to a flow chart shown in FIG. 6. When a new version of the printer driver becomes available, the delivery device may notify the image forming apparatus of the update. Alternatively, the image forming apparatus may inquire the delivery device periodically whether a new version of the printer driver becomes available.

In step S11, the delivery destination list is received from the administration device 4. In step S12, the delivery destination list is stored in the delivery destination administration unit 26. In step S13, the delivery device 2 starts a printer driver delivery program for sending the printer driver from the delivery device 2 to the image forming apparatus 3. In step S14, after starting the printer driver delivery program, the delivery device 2 reads the administration list stored in the printer driver storage unit 22 according to a method described later.

When the delivery device 2 registers the printer driver to be sent to the image forming apparatus 3, the delivery device 2 starts a printer driver registration program. Then, the printer driver registration program starts a registration function to read the printer driver from an external device connected to the delivery device 2 (not shown) or a CD-ROM. In this case, the user manually sets up the external device or the CD-ROM. With the printer driver registration program, the printer driver thus read is stored in the printer driver storage unit 22, and the administration list shown in FIG. 7 is created and stored in the printer driver storage unit 22.

The administration list includes columns containing dates of the update; version numbers; names of applied OS; actual file names of the printer drivers; and records whether the printer driver is sent to the image forming apparatus. In this case, when the new printer driver is registered, "YET" is written in the column showing whether the printer driver is sent to the image forming apparatus. When the printer driver is sent, "DONE" is written in the column.

In step S15, the delivery device 2 reads the administration list stored in the printer driver storage unit 22 to determine whether there is an image forming apparatus to which the new printer driver is not sent. When there is an image forming apparatus to which the new printer driver is not sent, the delivery device 2 reads the delivery destination list stored in the storage unit 21 in step S16. Then, the delivery device 2 determines the existence of the delivery destination and the delivery destination according to a method described below in step S17. That is, the delivery device 2 selects an image forming apparatus corresponding to the display of "YET" in the column showing whether the printer driver is sent to the image forming apparatus. Then, the delivery device 2 reads the IP address of the image forming apparatus 3, and negotiates with the image forming apparatus 3 of the address obtained to establish a communication path, so that the new printer driver stored in the printer driver storage unit 22 is sent to the image forming apparatus 3 through the delivery unit 23 in step S18. In this case, when there is a plurality of the image forming apparatus to which the new printer driver is sent, the IP addresses of the image forming apparatus are sequentially referred, thereby sending the new printer driver.

In step S19, the delivery device 2 determines whether the new printer driver is sent to all of the image forming apparatus 3 selected in step S18. For example, when one of the image forming apparatus 3 is turned off, it is not possible to access to the image forming apparatus 3 and send the printer driver. In such a case, the process proceeds to step the printer driver storage unit 22. When the delivery device 2 determines that the new printer driver is sent to all of the image forming apparatus 3, the delivery device 2 writes "DONE" in the column of the administration list showing whether the printer driver is sent to the image forming apparatus in step S20, and the administration list is stored in the printer driver storage unit 22.

In step S21, the delivery device 2 sends a sending result to the administration device 4 through the electrical mail function unit 25, and the process is completed.

When the delivery device 2 determines that the new printer driver is sent to all of the image forming apparatus 3 in step S15, the delivery device 2 sends an electrical mail message to the administration device 4 through the electrical mail function unit 25 indicating that the printer driver is not sent in step S21.

When the administration device 4 receives the message, the administration device 4 changes the contents of the column showing whether the printer driver is sent to the image forming apparatus in the delivery destination list stored in the storage unit 45. That is, when the administration device 4 receives the message indicating that the printer driver is sent, the administration device 4 changes the status to "DONE". When the administration device 4 receives the message indicating that the printer driver is not sent, the administration device 4 changes the status to "YET", and the delivery destination is stored in the storage unit 45.

When the delivery device 2 determines that the new printer driver is not sent to all of the image forming apparatus 3 in step S19, the delivery device 2 displays "YET" in the completion status in the delivery destination list. Further, the delivery device 2 calculates the number of delivery to the image forming apparatus 3 according to a method described later, and displays "RETRY" in the completion status in the delivery destination list.

In step S23, the delivery device 2 negotiates with the image forming apparatus 3 determined that the printer driver is not sent in step S22, so that the new printer driver is sent to the image forming apparatus 3 one more time. In step S24, the delivery device 2 determines that the new printer driver is sent to the image forming apparatus 3 in step S23. When it is determined that the new printer driver is sent to the image forming apparatus 3, the delivery device 2 writes "DONE" in the column of the administration list showing whether the printer driver is sent to the image forming apparatus 3 in step S20, and the administration list is stored in the printer driver storage unit 22.

In step S25, when the delivery device 2 determines that the new printer driver is not sent to all of the image forming apparatus 3 in step S24, the delivery device 2 determines whether the number calculated in step S22 is less than a specific number, for example, three. When the delivery device 2 determines that the number calculated in step S22 is less than the specific number in step S25, the delivery device 2 displays "RETRY" in the completion status in the delivery destination list in step S22. When the delivery device 2 determines that the number calculated in step S22 is more than the specific number in step S25, the delivery device 2 displays "YET" in the completion status in the delivery destination list in step S20, thereby completing the process as described above.

In the embodiment, after the delivery destination list is received from the administration device 4, the delivery device 2 starts the printer driver delivery program. Alternatively, the storage unit 21 stores the delivery destination list received from the administration device 4, and the delivery device 2 waits until the user starts the printer driver delivery program.

Figure 8:
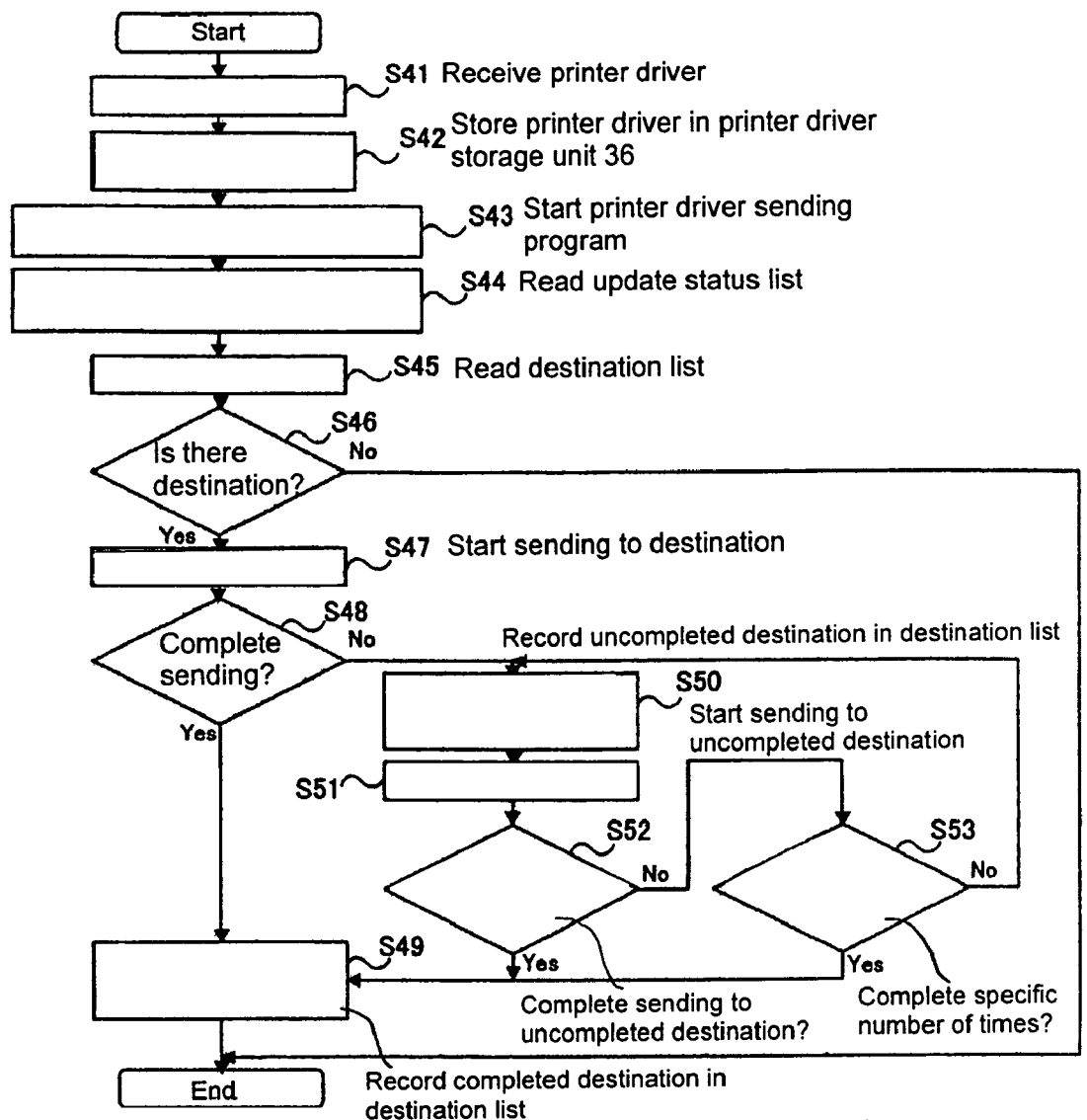
FIG. 8 is a flow chart showing a process of sending a printer driver from the image forming apparatus to an information processing device.

After receiving the new printer driver and the destination list as described above, the image forming apparatus 3 sends the printer driver to the information processing device 5 according to a flow chart shown in FIG. 8.

In step S41, the receiving unit 31 receives the printer driver from the delivery device 2 through the method described above. In step S42, the printer driver is stored in the printer driver storage unit 36. In step S43, the image forming apparatus 3 starts a printer driver sending program for sending the printer driver from the image forming apparatus 3 to the information processing device 5. In step S44, after starting the printer driver sending program, the image forming apparatus 3 reads an update status list stored in the administration unit 32.

As shown in FIG. 9, the update status list includes columns for inputting log-in names of the information processing device 5; last dates of printer driver update; version numbers of the printer drivers currently installed; names of OS currently using; and update results.

In step S45, the image forming apparatus 3 reads the destination list stored in the administration unit 32 through the method described above. In step S46, the determining unit 34 determines whether there is an information processing device 5 to which the new printer driver is not sent through a method described later. When there is the information processing device 5 to which the new printer driver is not sent, the image forming apparatus 3 refers to the destination list stored in the administration unit 32 in step S46. Then, the image forming apparatus 3 determines the destination according to the following method. That is, the image forming apparatus 3 selects the information processing device 5 corresponding to the display of "YET" in the column in the update status list showing that the printer driver is to be sent. Then, the image forming apparatus 3 reads the IP address of the information processing device 5 from the destination list, and negotiates with the information processing device 5 to establish a communication path.

In step S47, the new printer driver stored in the administration unit 32 is sent to the information processing device 5. In this case, when there is a plurality of the information processing devices to which the new printer driver is sent, the IP addresses of the information processing devices are sequentially referred, thereby sending the new printer driver through the sending unit 35.

In step S48, the image forming apparatus 3 determines whether the new printer driver is sent to all of the information processing devices 5 selected in step S47. For example, when one of the information processing devices 5 is turned off, it is not possible to access to the information processing device 5 and send the printer driver. In such a case, the process proceeds to step S50. When the image forming apparatus 3 determines that the new printer driver is sent to all of the information processing devices 5, the image forming apparatus 3 writes "DONE" in the column of the update result in the update status list in step S49, and the update status list is stored in the administration unit 32 followed by completing the process.

When the image forming apparatus 3 determines that the new printer driver is sent to all of the information processing devices 5 in step S46, the process is similarly completed.

When the image forming apparatus 3 determines that the new printer driver is not sent to all of the information processing devices 5 in step S46, the image forming apparatus 3 records "YET" in the column of the update result in the update status list in step S50. Further, the image forming apparatus 3 calculates the number of sending the printer driver to the information processing devices 5 according to a method described later, and writes "NOT" in the column of the update result in the update status list.

In step S51, the image forming apparatus 3 negotiates with the information processing device 5 determined that the printer driver is not sent to establish a communication path, so that the new printer driver is sent one more time. In step S52, the image forming apparatus 3 determines that the new printer driver is sent to the information processing device 5 in step S51. When it is determined that the new printer driver is sent to the information processing device 5, the image forming apparatus 3 writes "DONE" in the column of the update result in the update status list in step S49, and the update status list is stored in the administration unit 32.

In step S53, when the image forming apparatus 3 determines that the new printer driver is not sent to all of the information processing devices 5 in step S52, the image forming apparatus 3 determines whether the number calculated in step S50 is less than a specific number, for example, three. When the image forming apparatus 3 determines that the number calculated is less than the specific number in step S53, the image forming apparatus 3 writes "YET" in the column of the update result in the update status list one more time. When the image forming apparatus 3 determines that the calculated number is more than the specific number in step S53, the delivery device 2 writes "DONE" in the column of the update result in the update status list in step S49, and the process is completed.

In the embodiment, after the new printer driver is received from the delivery device 2, the image forming apparatus 3 starts the printer driver sending program. Alternatively, the printer driver storage unit 36 stores the printer driver received from the delivery device 2, and the image forming apparatus 3 waits until the user starts the printer driver sending program.

Further, in the embodiment, after the new printer driver is received from the delivery device 2, the image forming apparatus 3 starts the printer driver sending program. Alternatively, the printer driver storage unit 36 stores the printer driver received from the delivery device 2, and the image forming apparatus 3 waits. Then, the image forming apparatus 3 negotiates and establishes a communication path to send the printer driver when the user uses text creation software and the like on the information processing device 5 to send image information to the image forming apparatus 3.

In a specific sending process, for example, when the image forming apparatus 3 starts negotiating with the information processing device 5 to send the image information, the image forming apparatus 3 notifies the information processing device 5 that the printer driver is ready to be sent. When the information processing device 5 is notified, the information processing device 5 determines whether the information processing device 5 itself is ready to update the printer driver, and sends a result back to the image forming apparatus 3. When the information processing device 5 is not ready to update, the information processing device 5 sends the image information to the image forming apparatus 3. When the information processing device 5 is ready to update, the information processing device 5 notifies the image forming apparatus 3 that the information processing device 5 is ready. When the image forming apparatus 3 is notified that the information processing device 5 is ready to update, the image forming apparatus 3 sends the printer driver to the information processing device 5. Upon receiving the printer driver, the information processing device 5 updates the printer driver, and sends the image information to the image forming apparatus 3.

In the system described above, the delivery device delivers the printer driver according to the delivery destination list stored in the delivery device. Accordingly, it is possible to deliver the printer driver with high reliability. Further, it is notified whether the printer driver is updated with the information processing device receiving the printer driver. Accordingly, it is possible to update the printer driver simply through selecting the destination to be updated by the user. As a result, it is easy to update the printer driver without a cumbersome process such as downloading an updated printer driver according to an electrical mail notifying that an update printer driver is available and installing the printer driver.

Figure 10:
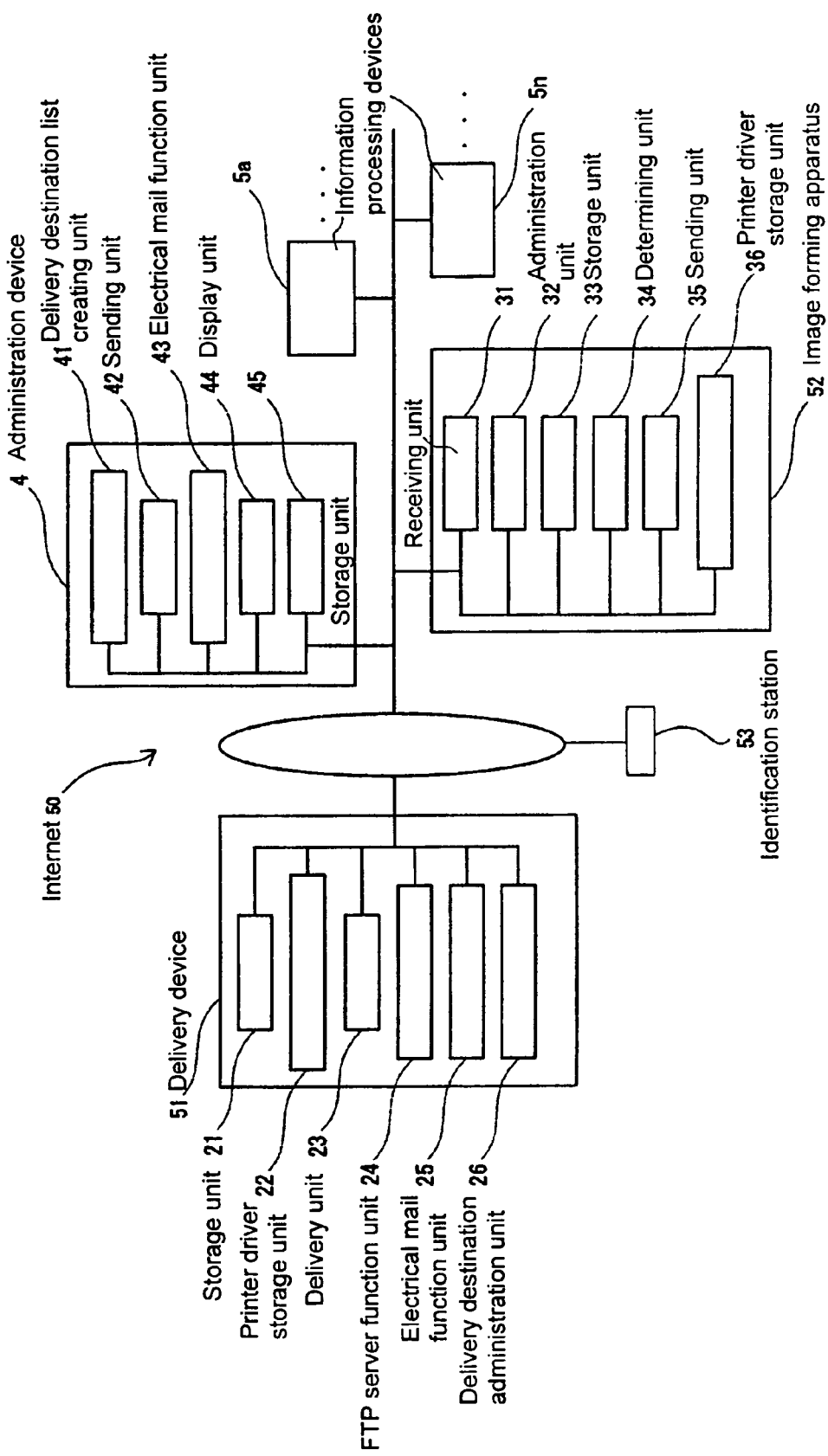
FIG. 10 is a schematic block diagram of a printer driver delivery system according to a second embodiment of the present invention.

Hereunder, a second embodiment of the present invention will be explained in detail. FIG. 10 is a schematic block diagram of a printer driver delivery system 50 according to the second embodiment of the present invention. In the description below, components same as those in the first embodiment are designated by the same reference numerals, and explanations thereof are omitted. Only features different from those in the first embodiment will be explained.

The printer driver delivery system 50 includes the administration device 4; a delivery device 51; an image forming apparatus 52; more than one information processing devices 5a to 5n (information processing device 5); and an identification station 53 for issuing a digital signature. The administration device 4 has a configuration same as that in the first embodiment, and explanation thereof is omitted.

The delivery device 51 includes a storage unit 21 for storing a delivery destination list as a delivery destination list storage unit; a printer driver storage unit 22 for storing the printer driver; a delivery unit 23 for externally delivering the printer driver; a FTP server function unit 24 for administrating file transfer protocol (FTP); an electrical mail function unit 25 for sending and receiving an electrical mail according to an external command; and a delivery destination administration unit 26 for receiving and storing the delivery destination list created with a method (described later) from the administration device 4.

The image forming apparatus 52 includes a receiving unit 31 for receiving the printer driver delivered from the delivery device 51; an administration unit 32 for administrating a destination of the printer driver as a destination list storage unit and a determining unit; a storage unit 33 for storing the destination of the printer driver; a determining unit 34 for determining the destination of the printer driver according to the destination list stored in the administration unit 32 and a type of printer driver; a sending unit 35 for sending the printer driver to the information processing device 5 according to a result of the determining unit 34; and a printer driver storage unit 36 for storing the printer driver delivered from the delivery device 51.

The identification station 53 issues a digital signature on the network, and is run by a third party or a user. The administration device 4 creates the delivery destination list and the destination list with a method same as that in the first embodiment, and sends the delivery destination list and the destination list to the delivery device 51 or the image forming apparatus 52.

When the delivery device 51 receives the delivery destination list, the delivery device 51 delivers the printer driver to the image forming apparatus 52 with a method same as that in the first embodiment. After the new printer driver is stored in the printer driver storage unit 22 and the administration list is created, the delivery device 51 obtains a digital signature from the identification station 53. The digital signature thus obtained is added to the printer driver to be sent to the image forming apparatus 52.

Figure 11:
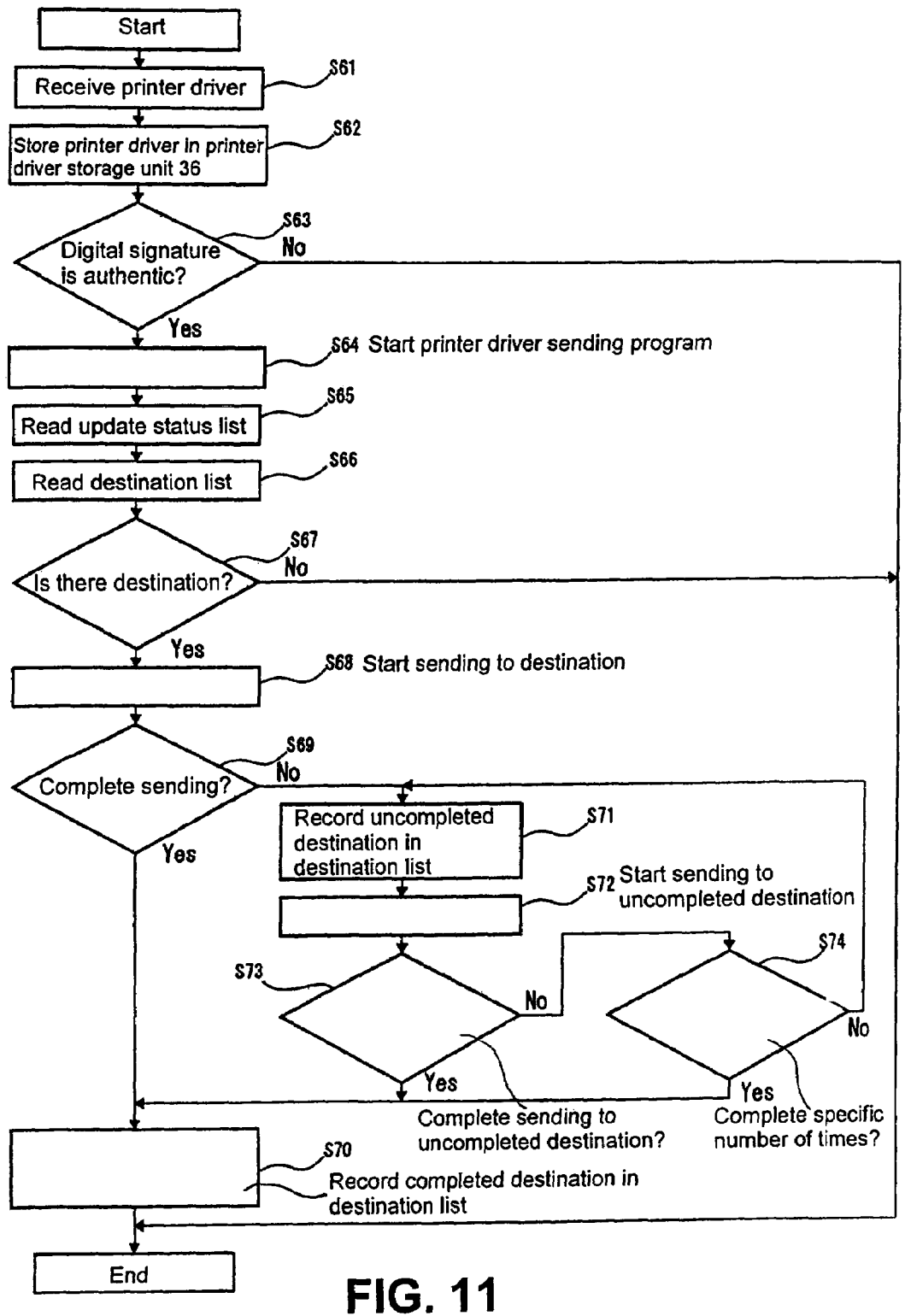
FIG. 11 is a flow chart showing a process of sending a printer driver from an image forming apparatus to an information processing device.

After receiving the printer driver with the digital signature through the method described above, the image forming apparatus 52 sends the printer driver to the information processing device 5 according to a flow chart shown in FIG. 11.

In step S61, the receiving unit 31 receives the printer driver from the delivery device 51 through the method described above. In step S62, the printer driver is stored in the printer driver storage unit 36. In step S63, the image forming apparatus 52 determines the authenticity of the digital signature sent with the printer driver. In order to determines the authenticity of the digital signature, PKI (Public Key Infrastructure) is stored in the storage unit 33 in advance. When the image forming apparatus 52 determines that the digital signature is authentic, the process proceeds to step S64. When the image forming apparatus 52 determines that the digital signature is not authentic, the process is completed.

In step S64, the image forming apparatus 52 starts a printer driver sending program for sending the printer driver from the image forming apparatus 52 to the information processing device 5. In step S65, after starting the printer driver sending program, the image forming apparatus 52 reads an update status list stored in the administration unit 32.

As shown in FIG. 9, the update status list includes columns for inputting log-in names of the information processing device 5; last dates of printer driver update; version numbers of the printer drivers currently installed; names of OS currently using; and update results.

In step S66, the image forming apparatus 52 reads the destination list stored in the administration unit 32 with the method described above. In step S67, the determining unit 34 determines whether there is the destination and identifies the destination through a method described later. When there is the information processing device 5 to which the new printer driver is not sent, the image forming apparatus 52 refers to the destination list stored in the administration unit 32 in step S67. Then, the image forming apparatus 52 determines the destination according to the following method. That is, the image forming apparatus 52 selects the information processing device 5 corresponding to the display of "YET" in the update result in the update status list showing that the printer driver is to be sent. Then, the image forming apparatus 52 reads the IP address of the information processing device 5 from the destination list, and negotiates with the information processing device 5 to establish a communication path.

In step S68, the new printer driver stored in the administration unit 32 is sent to the information processing device 5. In this case, when there is a plurality of the information processing devices to which the new printer driver is sent, the IP addresses of the information processing devices are sequentially referred, thereby sending the new printer driver through the sending unit 35.

In step S69, the image forming apparatus 52 determines whether the new printer driver is sent to all of the information processing devices 5 selected in step S68. For example, when one of the information processing devices 5 is turned off, it is not possible to access to the information processing device 5 and send the printer driver. In such a case, the process proceeds to step S71. When the image forming apparatus 52 determines that the new printer driver is sent to all of the information processing devices 5, the image forming apparatus 52 writes "DONE" in the column of the update result in the update status list in step S70, and the update status list is stored in the administration unit 32 followed by completing the process.

When the image forming apparatus 52 determines that the new printer driver is sent to all of the information processing devices 5 in step S67, the process is similarly completed.

When the image forming apparatus 52 determines that the new printer driver is not sent to all of the information processing devices 5 in step S67, the image forming apparatus 52 records "YET" in the column of the update result in the update status list in step S71. Further, the image forming apparatus 52 calculates the number of sending the printer driver to the information processing devices 5 according to a method described later, and writes "NOT" in the column of the update result in the update status list.

In step S72, the image forming apparatus 52 negotiates with the information processing device 5 determined that the printer driver is not sent in step S71 to establish a communication path, so that the new printer driver is sent one more time. In step S73, the image forming apparatus 52 determines that the new printer driver is sent to the information processing device 5 in step S72. When it is determined that the new printer driver is sent to the information processing device 5, the image forming apparatus 52 writes "DONE" in the column of the update result in the update status list in step S70, and the update status list is stored in the administration unit 32.

In step S74, when the image forming apparatus 52 determines that the new printer driver is not sent to all of the information processing devices 5 in step S73, the image forming apparatus 52 determines whether the number calculated in step S71 is less than a specific number, for example, three. When the image forming apparatus 52 determines that the number calculated is less than the specific number in step S74, the image forming apparatus 52 writes "YET" in the column of the update result in the update status list one more time. When the image forming apparatus 52 determines that the calculated number is more than the specific number in step S74, the image forming apparatus 52 writes "DONE" in the column of the update result in the update status list in step S70, and the process is completed.

In the embodiment, after the new printer driver is received from the delivery device 51, the image forming apparatus 52 starts the printer driver sending program. Alternatively, the printer driver storage unit 36 stores the printer driver received from the delivery device 51, and the image forming apparatus 52 waits until the user starts the printer driver sending program.

In the system described above, the delivery device 51 delivers the printer driver with the digital signature to the image forming apparatus 52. Accordingly, it is possible to safely deliver the printer driver with high reliability.

In the embodiments described above, the image forming apparatus is the printer as an example, and is not limited thereto. The image forming apparatus may include a plurality of apparatus. When there is a plurality of image forming apparatus, each of the image forming apparatus identifies the IP address of each of the information processing devices, and determines whether the printer driver is updated as shown in FIG. 5a.

The disclosure of Japanese Patent Application No. 2005-022460, filed on Jan. 15, 2005, is incorporated in the application.

While the invention has been explained with reference to the specific embodiments of the invention, the explanation is illustrative and the invention is limited only by the appended claims.

What is claimed is:

1. A printer driver delivery system for delivering a printer driver to an information processing device through a specific network, comprising:
a delivery device; and
an image forming apparatus,
wherein said delivery device includes,
a delivery destination list storage unit for storing a delivery destination list according to information of the image forming apparatus as a delivery destination to which a printer driver is delivered;
a printer driver storage unit for storing the printer driver; and
a delivery unit for delivering the printer driver to the image forming apparatus,
and said image forming apparatus includes,
a receiving unit for receiving the printer driver delivered from the delivery device;
a destination list storage unit for storing a destination list according to information of the information processing device on the specific network as a destination to which the printer driver is sent;
a determining unit for determining the destination of the printer driver according to the destination list; and
a sending unit for sending the printer driver received by the receiving unit to the information processing device according to a result of the determining unit.

2. The printer driver delivery system according to claim 1, further comprising an administration device connected to the specific network for creating the delivery destination list and the destination list.

3. The printer driver delivery system according to claim 2, wherein said administration device is operated by a user to create the delivery destination list and the destination list.

4. The printer driver delivery system according to claim 2, wherein said administration device is incorporated in the information processing device.

5. The printer driver delivery system according to claim 1, wherein said image forming apparatus further includes a first storage unit for storing a status that the printer driver is not sent to the information processing device after the image forming apparatus tries to send the printer driver to the information processing device for a specific number of times, said sending unit sending the printer driver again according to the status stored in the storage unit.

6. The printer driver delivery system according to claim 1, wherein said delivery device further includes a second storage unit for storing a status that the printer driver is not delivered to the image forming apparatus after the delivery device tries to deliver the printer driver to the image forming apparatus for a specific number of times, said delivery unit delivering the printer driver again according to the status stored in the second storage unit.

7. The printer driver delivery system according to claim 1, further comprising an identification station for issuing a digital signature.

8. The printer driver delivery system according to claim 7, wherein said delivery device further includes a digital signature obtaining unit for obtaining the digital signature issued from the identification station.

9. The printer driver delivery system according to claim 8, wherein said delivery device is adapted to attach the digital signature to the printer driver and deliver the printer driver with the digital signature to the image forming apparatus.

10. The printer driver delivery system according to claim 9, wherein said image forming apparatus further includes an authenticity determining unit for determining authenticity of the digital signature attached to the printer driver.

11. An image forming apparatus, comprising:
an obtaining unit for obtaining a printer driver delivered from an external device;
a destination list storage unit for storing a destination list according to information of an information processing device on a specific network as a destination to which the printer driver is sent;
a determining unit for determining the destination of the printer driver according to the destination list;
a sending unit for sending the printer driver to the information processing device according to a result of the determining unit; and
a control unit for communicating with the information processing device to control the sending unit when the obtaining unit obtains the printer driver delivered from the external device.

12. The image forming apparatus according to claim 11, further comprising a storage unit for storing a status that the printer driver is not sent to the information processing device after the image forming apparatus tries to send the printer driver to the information processing device for a specific number of times, said sending unit sending the printer driver again according to the status stored in the storage unit.

13. The image forming apparatus according to claim 11, further comprising a receiving unit for receiving a digital signature attached to the printer driver, and an authenticity determining unit for determining authenticity of the digital signature attached to the printer driver.

* * * * *